_United States Patent Office_

3,507,760
Patented Apr. 21, 1970

3,507,760
RADIATION-INDUCED ION-MOLECULE
REACTIONS
Boris Levy, Crosswicks, N.J., assignor to Mobil Oil
Corporation, a corporation of New York
No Drawing. Filed June 16, 1964, Ser. No. 375,649
Int. Cl. B01j 1/10; C07c 3/24
U.S. Cl. 204—157.1                         12 Claims

ABSTRACT OF THE DISCLOSURE

A method of forming a gaseous mixture of a molecule reactant, such as carbon monoxide and an ion reactant precursor, such as an alkane, and irradiating the mixture with high energy radiation to ionize the molecule reactant which then reacts with the precursor to effect charge transfer, thereby forming the reactant product, such as an oxygenated polymeric material. Another molecule reactant is methane and other ion reactant precursors include ammonia and aliphatic hydrocarbons such as alkenes. The molecule reactant is present in a major amount in the gaseous mixture.

This invention relates to ion-molecule reactions carried out by means of nuclear radiation and to the products thereof.

Nuclear radiation is capable of breaking any chemical bond, even in the most stable compounds. As a result, a wide distribution of products may be found when even simple compounds are irradiated. The invention proposes to make use of this capability in order to produce useful and interesting products in increased yields; and in particular to carry out radiation-induced chemical reactions in the gas phase, where ions initially formed by radiation interaction are found to have relatively long lifetimes and where, as a result, there is good probability that they may react with neutral molecules. More particularly, the invention employs a molecule reactant to absorb radiation energy in a given system, thereby forming ions which are able to transfer charge to an ion reactant precursor, ionizing the latter. While a number of reactions are possible, it is contemplated that the molecule reactant reacts with the ion reactant in an ion-molecule reaction to form products of value. Thus, instead of gross bond breakage, as might be expected from direct radiation interaction, useful ion-molecule reactions take place.

In a preferred form, the invention comprises a method for carrying out an ion-molecule reaction in a system wherein the molecule reactant is characterized by its stability against radiation attack, by which is meant that, though ionizable, it is not readily prone to damage such as would render it unsuitable for further reaction leading to valuable products. It preferably has an ionization potential greater than that of the ion reactant, and preferably too comprises the major component of the system being irradiated. Carbon monoxide and methane are the preferred molecule reactants. The method comprises forming a gaseous mixture of the molecule reactant and ion reactant precursor, and irradiating the mixture with ionizing radiation to ionize the molecule reactant, preferably absorbing in the latter a major portion of the absorbed radiation. Without being bound by theory, it is considered that the ionized molecule reactant reacts with the precursor to effect charge transfer, thereby forming the ion reactant and neutralizing the molecule reactant, and that then the ion and molecule reactants react to form a product, this reaction being at least thermoneutral and preferably exothermic. The product or products are recovered.

An illustrative system is one comprising carbon monoxide (hereinafter designated CO) as the molecule reactant, and ethane. Ethane, $C_2H_6$, is the precursor of the ion reactant and forms such reactant, $C_2H_6^+$, upon being ionized. The ionization potential of ethane is 11.5 e.v. (electron volts), which signifies that when a molecule of ethane in its normal state absorbs 11.5 e.v. of radiation energy, it can be expected to lose an electron and form a positively charged ion, $C_2H_6^+$. The ionization potential of CO is 14.00 e.v. These gases are mixed together such that the CO is preferably present in major amount, and the mixture is then subjected to ionizing radiation applied at a rate and intensity sufficient to ionize the CO and preferably to absorb therein a major portion of the absorbed radiation. As indicated, the ionized CO reacts with the precursor to effect charge transfer, forming ionized ethane. While bond breakage in the ethane is possible, it is minimized by the high concentration of CO, which as noted is able to take up most of the absorbed radiation and which is a fairly stable compound.

Following charge transfer to the ethane, the ionized CO becomes neutral, and the resulting ethane ions are able to react with the neutral or molecular CO in the ion-molecule reaction. Without being bound by theory, it is considered that an exothermic reaction like the following may occur:

$$C_2H_6^+ + CO \rightarrow (C_2H_6CO)^+$$

The ionic entity on the right is reactive, either with itself, or with one or both reactants on the left, or with ethane, or with all entites, or it may become neutralized. It is thus possible to form one or more of a number of different products of varying molecular weight depending on the way the ionic product in the foregoing equation reacts. The ultimate product may be a polymeric material of varying molecular weight which contains ester groups, and either ketone or aldehyde groups or both, and which is described below in more detail. Or it may be a non-polymeric material of some complexity having one or more of the groups just noted; or it may be a fairly simple compound.

It is of particular interest to note that bond breakage of the ethane is minimized by the presence of a large concentration of CO, which absorbs most of the radiation, thus protecting, so to speak, the other component against bond breakage, and which further tends to transfer only an amount of energy to the ethane to effect charge exchange.

The foregoing process is performable at ambient temperatures and pressures and for varying times. It is possible to convert a large proportion of the ethane, going up to 80, 90, or even 100% of the amount originally present. Some by-product gases are observable, like hydrogen, carbon dioxide and n-butane in very small amounts of the order of less than 1 mole percent of the original gaseous mixture.

The method provides a convenient way of obtaining interesting products of the kind described from compounds like ethane, which is generally considered a low value hydrocarbon. In particular, the polymeric product is considered of value per se, and also because of its constituent groups. By virtue of the latter, the material tends to be reactive, so that it may be modified to form other interesting product, and it may be useful as a modifier for other polymers and materials. It is further distinctive in being formed by a gaseous phase reaction; thus unreacted monomer of the polymeric material is substantially absent, unlike some conventional monomers in liquid phase reactions. Yields of up to 80 or 90%, or more, based on the ethane, are obtainable.

High energy ionizing radiation of any kind and from any suitable source may be used to irradiate, including both ionizing particle radiation and ionizing electromagnetic radiation; the former comprises accelerated electrons, nuclear particles like protons, fast neutrons, alpha and beta particles, deuterons, fission fragments, and the like; and the latter comprises gamma rays and X-rays. Gamma rays are a convenient and practical radiation.

The radiation may be obtained from various sources, including natural radioactive materials, which emit alpha, beta, and gamma radiation; from nuclear fission by-products of processes in which atomic power is generated, these by-products including elements having atomic numbers ranging from 30 to 63; from materials made radioactive by exposure to neutron radiation, such as cobalt-60, caesium-137, sodium-24, manganese-56, gadolinium-72, lanthanum-140, etc.; or from operating nuclear reactors. The charged particles may be brought to high energy levels by acceleration in conventional devices. For example, high speed electrons having energies of 0.5 to 15 m.e.v. can be supplied by Van de Graaeff generators, resonant transformers, linear accelerators, etc. High energy X-ray machines are a source of X-rays.

A practically useful energy level for the process is 1 m.e.v., although the level may range from 0.5 to 15 m.e.v., and more broadly from 1 k.e.v. to 20 or 30 m.e.v. It will be understood that the invention is not dependent on the energy level of the radiation, which may be as low as is effective to ionize the CO, and as high as desired.

The radiation dose is variable, but should be at least sufficient to produce a chemical conversion and, of course, not so high as to destroy the product. Total dose may range from 0.0001 to 1,000, preferably 0.01 to 100 megarads. Useful dose rates may run from 0.1 to 1 megarad/hour, although this value may be increased or decreased as desired. A typical range is 0.01 to 10 megarads/hour, and a more general range is 0.001 to one thousand megarads/hour. Some control over the molecular weight of the product is possible by varying the dose rate, the product tending to be of lower molecular weight at higher dose rates and of higher molecular weight at lower dose rates. Variation of dose rate may be accomplished by varying the source strength of radiation, keeping the CO concentration constant, or by varying the CO concentration, keeping the radiation source strength constant.

Irradiation can be done at normal or ambient temperatures. There is no lower temperature limit, although the upper limit is desirably chosen to preserve the product. Pressures may be ambient or may range from subatmospheric to any desired greater pressure; for example, up to 1 or 2 thousand atmospheres, or more. Irradiation times are widely variable.

Other systems of gaseous reactants that may be irradiated to form useful products are suitable for the practice of the invention. Thus, using CO as the molecule reactant, one system includes propane as the ion reactant or precursor thereof. Ionization potentials of the CO and propane are 14.00 and 11.2 e.v., respectively. Another system (with ionization potentials immediately following each reactant) includes CO 14.00 e.v., and ethylene 10.51 e.v. Also, CO 14.00 e.v. and propylene 9.7 e.v.; CO 14.00 e.v. and butane 10.8 e.v.; CO 14.00 e.v. and methane 13.2 e.v.; CO 14.00 e.v. and ammonia 10.52 e.v.

Another reactant molecule is methane which may be used in such systems as: methane 13.2 e.v. and water 12.61 e.v.; and methane 13.2 e.v. and ammonia 10.52 e.v. Upon absorbing 13.2 e.v., methane is regarded as forming $CH_4^+$; it may also absorb 14.31 e.v. to form $CH_3^+$ or 15.6 e.v. to form $CH_2^+$.

It will be noted that the reactant molecules are single carbon atom compounds as well as being fairly stable against radiation damage.

The ion reactant precursor is preferably a low molecular weight aliphatic hydrocarbon, suitably an alkane or alkene, and preferably having 2 or 3 to 6 carbon atoms, but also including aliphatic hydrocarbons having up to 12 or 15 carbons. It is desirable that the hydrocarbon be gaseous or liquid at ambient temperatures; liquid hydrocarbons can of course be vaporized by heating to secure vapor phase conditions for the irradiation. Other precursors are water and ammonia.

As will be understood in each system the chemical reaction between the ion and molecule reactants is either thermoneutral or exothermic to insure that the reaction is thermodynamically possible. It is believed that the reaction proceeds along the ion-molecule route as indicated. It is however possible that other reactions may take place and may account for the results, at least in part; for example, in a CO-ethane system, CO ions in an excited state may form by absorption of the radiation, these comprising ions having more energy than CO ions in the ground state, and the excited ions may collide with molecular ethane to fragmentize the latter or they may collide with molecular CO, forming CO ions and dissipating their energy, the resulting CO ions then reacting with ethane to effect charge transfer, as described. Also, and as indicated, it will be understood that in referring to the ionization potential of any compound, there is contemplated not only the potential of the ground state of the compound but also that of its excited state or states.

A useful modification comprises employing reactants such that the molecule reactant has an ionization potential sufficiently greater than that of the ion reactant precursor that upon irradiation of such a system, the precursor will predominantly undergo fragmentation to form several ionic species and/or free radicals. In other words, changes more far reaching than charge transfer take place, involving formation of lighter ionic and/or free radical species which react with one another, and/or with the molecule and/or ion reactants, to form interesting products. It is preferred, at least in some cases, to select reactants where the difference in ionization potential is at least 2 or 3 e.v. In this connection, hydrocarbons having three or more carbon atoms are of special interest as ion reactant precursors because of the increased number of reactive species which they may form.

A further modification comprises irradiating two ion reactant precursors, together with the molecule reactant, to the end of forming products of further interest. Or two molecule reactants may be mixed with an ion reactant precursor and the mixture irradiated. In either case, a molecule reactant preferably has the greatest ionization potential of the system and is present in major amount; in addition, the reaction involving all reactants should be a thermoneutral or exothermic one. As an example, a suitable system comprises CO 14.00 e.v. as the molecule reactant, and ethane 11.5 e.v. and ammonia 10.52 e.v. as ion reactant precursors. It will be understood that in these three-reactant systems the procedures described in the preceding modifications may apply, that is, the reactants may be selected so that the ion reactants are ionized by charge transfer from the molecule reactant, or the selection may be such that the ion reactant or reactants undergoes fragmentation as the predominant reaction.

In another form of the invention it is possible to reverse the concentrations of the ion and molecule reactants, that is, to employ the ion reactant in a greater concentration such that it absorbs a major portion of the absorbed radiation. For example, in a CO-ethane system, the ethane may be present in major amount, and upon irradiation of the system, fragments such as $C_2H_6^+$, $CH_3^+$, and the like, may form which react with the CO in ion-molecule or radical-molecule reactions, or which react with one another with like fragments in ion-radical or ion-ion or radical-radical reactions to form products of interest. A diversity of products is favored, all or most of which are of greater value than the starting materials.

The invention may be illustrated by the following examples.

EXAMPLE 1

A mixture of gases was made up comprising 87.85 mole percent CO and 12.15 mole percent ethane and was introduced to a previously evacuated 1-liter glass vessel having the form of an elongated cylinder. The vessel had an inlet and an outlet tube at its upper end and was closed off at the lower end. The gas mixture was permitted to fill the vessel at a pressure of 17 cm. of mercury and at room temperature, and was then sealed off. It was placed in a hot cell where it was disposed centrally of a group of 8 upstanding pencils or rods of cobalt-60 so that the pencils were arranged circumferentially of the vessel and extended parallel to it. The gas mixture was irradiated at ambient temperature at a dose rate of about 0.6 megarad per hour over a period of 76 hrs. After removal of the vessel from the hot cell, a solid waxy product was observed on the bottom of the vessel. An amount of 2.5 mg. of this product was recovered. Its carbon-hydrogen analysis is as follows:

|  | Percent |
|---|---|
| Carbon | 55.92 |
| Hydrogen | 7.59 |
| Oxygen (by difference) | 36.50 |

Infrared analysis revealed the presence of ester groups, and ketone and/or aldehyde groups. An empirical formula was considered to be $(C_{2.04}H_{3.22}O)_n$. No light products were detected in the gaseous phase other than very small amounts (about 0.4 mole percent) of hydrogen and carbon dioxide, as well as unchanged reactants.

EXAMPLE 2

Example 1 was repeated, using a gaseous mixture comprising 85.61 mole percent CO and 14.39 mole percent ethane, a pressure of 16.26 cm. of mercury, and a radiation interval of 95 hours. A solid waxy product was obtained having essentially the same infra-red analysis and the following carbon-hydrogen analysis:

|  | Percent |
|---|---|
| Carbon | 62.75 |
| Hydrogen | 8.58 |
| Oxygen (by difference) | 28.67 |

Its empirical formula was $(C_{2.92}H_{4.75}O)_n$, and it had a melting point of about 75° C.

EXAMPLE 3

A gaseous mixture comprising 75.9 mole percent CO and 23.8 mole percent ethylene was irradiated as in Example 1, using a pressure of 34.33 cm. mercury and a radiation time of 96 hours. A solid waxy deposit was observed in the vessel. This product was dissolved in carbon tetrachloride, and it was noted that a minor fraction did not dissolve. A carbon-hydrogen analysis of both the insoluble and soluble fractions is as follows:

|  | Percent | |
|---|---|---|
|  | Insoluble | Soluble |
| Carbon | 78.77 | 72.16 |
| Hydrogen | 12.83 | 9.71 |
| Oxygen (by difference) | 8.40 | 18.13 |

The insoluble fraction was determined by infra-red analysis to contain aldehyde and ketone groups, while only ester groups were detected in the soluble fraction. No light irradiation products were observed in the gaseous phase other than unchanged reactants, very small amounts (0.4 to 0.2 mole percent) of hydrogen, carbon dioxide, and pentanes, and trace amounts of butanes.

From CO and ethane, as Examples 1 and 2 show, the polymeric material is an oxygenated product whose empirical formula shows it to have two to three atoms of carbon and three to five atoms of hydrogen per atom of oxygen. Carbon content ranges from 56 to 63%, hydrogen content from 7.6 to 8.6%, and oxygen content from 36.5 to 28.7%.

It will be understood that the invention is capable of obvious variations without departing from its scope.

In the light of the foregoing description, the following is claimed:

1. Method for producing an oxygenated polymeric material at ambient temperatures comprising irradiating with gamma radiation a gaseous mixture of ethane and CO, the CO being present in said mixture in a major amount, absorbing in the CO the major portion of the absorbed radiation, applying said radiation at a rate and intensity sufficient to form ionized CO, reacting the ionized CO with the ethane to effect charge transfer therebetween, thereby forming ionized ethane and molecular CO, reacting the ionized ethane with the molecular CO in an exothermic ion molecule reaction to form said oxygenated polymeric material, and recovering the latter, said material being in the form of a waxy solid containing the elements C, H, and O in substantially the following amounts:

|  | Percent |
|---|---|
| Carbon | 56–63 |
| Hydrogen | 7.6–8.6 |
| Oxygen (by difference) | 36.5–28.7 | said material having the approximate molecular formula of $(C_{2-3}H_{3-5}O)_n$.

2. Oxygenated polymeric material produced by the method of claim 1 further characterized by the presence of ester groups and one other oxygen-containing group selected from the class consisting of ketone and aldehyde groups.

3. A method for carrying out a radiation-induced thermoneutral to exothermic ion-molecule reaction in a gaseous system comprising carbon monoxide as an ionizable molecule reactant and an ion reactant precursor selected from an aliphatic hydrocarbon, water, and ammonia, said molecule reactant being characterized by its substantial stability against radiation damage, by having an ionization potential greater than that of said ion reactant precursor, and by being present in a major amount, comprising irradiating said system with ionizing radiation at a dose rate of 0.001 to 1000 megarads/hr. and an energy level of 1 k.e.v. to 30 m.e.v. to ionize said molecule reactant and to absorb therein a major portion of the absorbed radiation, thereby to minimize bond breakage of said precursor, reacting ionized molecule reactant with precursor to effect charge transfer, thereby forming ion reactant and neutralized molecule reactant, reacting said ion and molecule reactants to form a product, and recovering said product.

4. Method of claim 3 wherein said precursor is ammonia.

5. Method of claim 3 wherein said precursor is an aliphatic hydrocarbon.

6. Method of claim 5 wherein said hydrocarbon is an alkane.

7. Method of claim 5 wherein said hydrocarbon has 3 to 15 carbon atoms.

8. Method of claim 5 wherein said hydrocarbon has 3 to 6 carbon atoms.

9. Method of claim 5 wherein said hydrocarbon is ethane.

10. Method of claim 5 wherein said hydrocarbon is ethylene.

11. Method for producing an oxygenated polymeric material at ambient temperatures comprising irradiating with gamma radiation a gaseous mixture of ethylene and CO, the CO being present in said mixture in a major amount, absorbing in the CO the major portion of the absorbed radiation, applying said radiation at a rate and intensity sufficient to form ionized CO, reacting the ionized CO with the ethylene to effect charge transfer therebetween, thereby forming ionized ethylene and molecular CO, reacting the ionized ethylene with the molecular CO in an exothermic ion molecule reaction to form said oxygenated polymeric material, and recovering the latter, said material being in the form of a waxy ester group-containing solid containing the elements C, H, and O in substantially the following amounts:

| | Percent |
|---|---|
| Carbon | 72–79 |
| Hydrogen | 9–13 |
| Oxygen (by difference) | 8–18 |

12. A method for carrying out a radiation-induced thermoneutral to exothermic ion-molecule reaction in a gaseous system comprising methane as an ionizable molecule reactant and water as ion reactant precursor, said molecule reactant and precursor being initially present in said system at the time irradiation is begun, said molecule reactant being characterized by its substantial stability against radiation damage, by having an ionization potential greater than that of said ion reactant precursor, and by being present in a major amount, comprising irradiating said system with ionizing radiation to ionize said molecule reactant and to absorb therein a major portion of the absorbed radiation, thereby to minimize bond breakage of said precursor, reacting ionized molecule reactant with precursor to effect charge transfer, thereby forming ion reactant and neutralized molecule reactant, reacting said ion and molecule reactants to form a product, and recovering said product.

References Cited

UNITED STATES PATENTS

| | | | |
|---|---|---|---|
| 3,104,263 | 9/1963 | Riemenschneider | 260—604 |
| 2,992,173 | 7/1961 | Ruskin | 204—162 |
| 2,956,938 | 10/1960 | Vaughan | 204—162 |
| 3,022,237 | 2/1962 | Heath | 204—162 |
| 3,168,456 | 2/1965 | Furrow | 204—162 |

OTHER REFERENCES

Collinson et al., Chemical Reviews, vol. 56, June 1956, pages 447 and 478.

Ellis et al., The Chemical Action of Ultraviolet Rays (1941), page 322.

HOWARD S. WILLIAMS, Primary Examiner

U.S. Cl. X.R.

204—158, 162; 260—2, 63